(12) United States Patent
Amano

(10) Patent No.: US 6,978,082 B1
(45) Date of Patent: Dec. 20, 2005

(54) AV DECODER CONTROL METHOD AND AV DECODER CONTROL APPARATUS

(75) Inventor: Tomoyasu Amano, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 972 days.

(21) Appl. No.: 09/787,284

(22) PCT Filed: Jul. 13, 2000

(86) PCT No.: PCT/JP00/04689

§ 371 (c)(1),
(2), (4) Date: Jun. 13, 2001

(87) PCT Pub. No.: WO01/06778

PCT Pub. Date: Jan. 25, 2001

(30) Foreign Application Priority Data

Jul. 15, 1999 (JP) .................................. 11-201794

(51) Int. Cl.[7] .............................. H04N 5/91; H04N 7/26

(52) U.S. Cl. ........................ 386/68; 386/109; 386/111

(58) Field of Search ............................ 386/68, 69, 75, 386/81, 82, 6, 46, 1, 109, 111, 112, 27, 33, 386/124, 125, 126, 105, 106, 104

(56) References Cited

U.S. PATENT DOCUMENTS

| 5,887,111 A | * | 3/1999 | Takahashi et al. ............ 386/68 |
| 5,923,811 A | | 7/1999 | Kawamura et al. |
| 5,946,446 A | * | 8/1999 | Yanagihara .................. 386/68 |
| 6,061,496 A | | 5/2000 | Nakamura et al. |
| 6,801,709 B1 | * | 10/2004 | Park ........................... 386/68 |

FOREIGN PATENT DOCUMENTS

| EP | 0866461 A2 | 9/1998 |
| JP | 7-240899 | 9/1995 |
| JP | 8-70433 | 3/1996 |
| JP | 10-93876 | 4/1998 |
| WO | 97/19552 | 5/1997 |
| WO | 99/20045 | 4/1999 |

\* cited by examiner

*Primary Examiner*—Robert Chevalier
(74) *Attorney, Agent, or Firm*—Wenderoth, Lind & Ponack, L.L.P.

(57) ABSTRACT

There is provided an AV decoder control method and an AV decoder control apparatus for controlling an AV decoder so that it performs a trick play by continuously displaying I picture of MPEG video data. A plurality of bit streams having a predetermined bit length and positioned at arbitrary intervals are sequentially and separately input to the AV decoder. I pictures included in these bit streams having the predetermined bit length are continuously displayed while sequentially updating the I pictures, whereby high-speed I playback is realized.

6 Claims, 4 Drawing Sheets

AV DECODER CONTROL METHOD AND AV DECODER CONTROL APPARATUS

TECHNICAL FIELD

The present invention relates to an AV (Audio Visual) decoder control method and an AV decoder control apparatus which are used for an AV decoding/playback apparatus having an AV decoder for decoding a bit stream including compressed video data and audio data to play back video and audio. More particularly, the present invention relates to an AV decoder control method and an AV decoder control apparatus for trick play in which I pictures (Intra-frame coded pictures) of video data are continuously displayed by an AV decoder.

BACKGROUND ART

With the development of digital technology in recent years, playback methods using recording media such as optical disks and magnetic disks have been put to practical use for playback of digitized sources, and various kinds of data compression/multiplexing methods have been proposed. MPEG (Moving Picture Experts Group) is one of these methods, and especially MPEG1 is used for video CD. In MPEG1, I pictures are included in GOP (group of pictures), and each I picture maintains its independence by itself, differently from B pictures (Bidirectionally predictive coded pictures) and P pictures (Predictive coded pictures). By continuously decoding the I pictures (hereinafter referred to as I playback), a trick play such as fast forward playback (i.e., forward I playback) or fast reverse playback (i.e., backward I playback) is achieved.

However, since no navigation information is included in a video CD while it is included in a DVD (Digital Versatile Disc), the position of GOP which appears in a bit stream cannot be predicted. Therefore, in an AV decoding/playback apparatus such as a video CD player, in order to perform I playback, a bit stream is divided into unit lengths without considering GOP included in the bit stream, the thus obtained bit streams are sequentially input to the AV decoder for decoding, and I pictures included in each bit stream are sequentially displayed.

More specifically, in the conventional I playback, a bit stream is divided into plural bit streams having the same bit length, and these divided bit streams are sequentially read from the disk and input to the AV decoder for decoding. Every time an I picture appears, the I picture is displayed. When decoding of one divided bit stream is completed, the following divided bit stream is input to the AV decoder.

In the conventional I playback, however, the time required for moving the playback point (seek point) on the bit stream in the I playback by one divided bit length is equal to the time required for reading and decoding one divided bit stream and, therefore, the time for moving the playback point on the bit stream for fast-forward playback or fast-reverse playback is increased. As a result, high-speed forward playback or reverse playback cannot be achieved.

The present invention is made to solve the above-described problems and has for its object to provide an AV decoder control method and an AV decoder control apparatus which can perform high-speed I playback using an AV decoder.

DISCLOSURE OF THE INVENTION

In an AV decoder control method according to the present invention, a plurality of bit streams having a predetermined bit length and positioned at arbitrary intervals, which are obtained by dividing a bit stream including MPEG video data and audio data, are separately and sequentially input to an AV decoder and decoded, and I pictures of the video data included in these bit streams of the predetermined bit length are continuously displayed while updating the I pictures. Therefore, in I playback, the time required for moving the playback point (seek point) on each bit stream by a distance that is the sum of the arbitrary interval and the predetermined bit length, becomes equal to the time required for decoding the bit stream of the predetermined bit length, thereby providing an AV decoder control method which permits the AV decoder to perform high-speed I playback.

Further, in the above-described AV decoder control method, display of the I picture which is currently displayed is continued until the displayed I picture is updated. Therefore, even when the bit stream includes errors, block noise and a flashing screen due to decoding of insignificant data are avoided.

Further, in the above-described AV decoder control method, when inputting a bit stream of the predetermined bit length to the AV decoder, a previous bit stream of the predetermined bit length, which has been input to the AV decoder most recently and stored in a buffer in the AV decoder, is erased. Therefore, the buffer in the decoder is maintained in the normal state, whereby abnormal display is avoided.

Further, in the above-described AV decoder control method, it is decided whether display of I pictures in a bit stream of the predetermined bit length by the AV decoder has been completed or not, and when the display of I pictures has been completed, a next bit stream of the predetermined bit length, which follows the bit stream for which display of I pictures has ended, is input to the AV decoder. Therefore, the AV decoder can perform high-speed I display.

Further, in the above-described AV decoder control method, a plurality of bit streams which are obtained by dividing each of the bit streams having the predetermined bit length are sequentially input to the AV decoder at predetermined intervals, and every time one divided bit stream is input to the AV decoder, it is decided whether display of I pictures by the AV decoder has been completed or not. When display of I pictures has not been completed yet, a next divided bit stream within the same bit stream is input to the AV decoder. On the other hand, when display of I pictures has been completed, a next bit stream of the predetermined bit length, which follows the bit stream for which display of I pictures has ended, is input to the AV decoder. Therefore, the AV decoder can perform high-speed I playback.

Further, in the above-described AV decoder control method, an optimum bit length of the bit streams having the predetermined bit length is obtained from repetition of inputting these bit streams to the AV decoder, and the bit length is optimized using this result. Therefore, the AV decoder can perform high-speed I playback.

Further, an AV decoder control apparatus according to the present invention is provided with means for controlling an AV decoder so that the AV decoder decodes a plurality of bit streams having a predetermined bit length and positioned at arbitrary intervals, which are separately and sequentially input to the AV decoder, and continuously displays I pictures included in these bit streams while sequentially updating the I pictures. Therefore, in I playback, the time required for moving the playback point (seek point) on each bit stream by a distance that is the sum of the arbitrary interval and the predetermined bit length, becomes equal to the time required for decoding the bit stream of the predetermined length, thereby providing an AV decoder control method which permits the AV decoder to perform high-speed I playback.

Further, the above-described AV decoder control apparatus includes means for continuing display of the I picture which is currently displayed until the displayed I picture is updated. Therefore, even when the bit stream includes errors, block noise and a flashing screen due to decoding of insignificant data are avoided.

Further, the above-described AV decoder control apparatus includes means for, when inputting a bit stream of the predetermined bit length to the AV decoder, erasing a previous bit stream of the predetermined bit length which has been input to the AV decoder most recently and stored in a buffer in the AV decoder. Therefore, the buffer in the decoder is maintained in the normal state, whereby abnormal display is avoided.

Further, the above-described AV decoder control apparatus includes means for deciding whether display of I pictures in a bit stream of the predetermined bit length by the AV decoder has been completed or not, and when display of I pictures has been completed, this means inputs, to the AV decoder, a next bit stream of the predetermined bit length that follows the bit stream for which display of I pictures has ended. Therefore, the AV decoder can perform high-speed I playback.

Further, the above-described AV decoder control apparatus includes means for sequentially inputting a plurality of bit streams which are obtained by dividing each of the bit streams having the predetermined bit length to the AV decoder at predetermined intervals, and for deciding whether display of I pictures by the AV decoder has been completed or not every time one divided bit stream is input. When display of I pictures has not been completed, this means inputs a next divided bit stream within the same bit stream to the AV decoder. On the other hand, when display of I pictures has been completed, this means inputs, to the AV decoder, a next bit stream of the predetermined bit length that follows the bit stream for which display of I pictures has ended. Therefore, the AV decoder can perform high-speed I playback.

Further, the above-described AV decoder control apparatus includes means for obtaining an optimum bit length of the bit streams having the predetermined bit length from repetition of inputting these bit stream to the AV decoder, and for optimizing the bit length by using this result. Therefore, the AV decoder can perform high-speed I playback.

BEST MODE TO EXECUTE THE INVENTION

Embodiment 1

Figure 1:
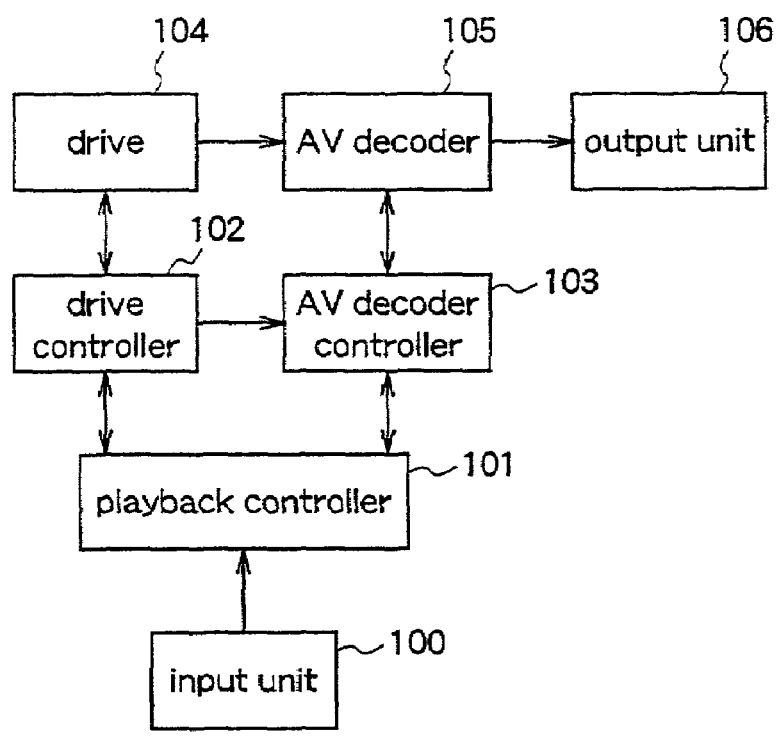
FIG. 1 is a block diagram illustrating a video CD player for explaining an AV decoder control method and an AV decoder control apparatus according to a first embodiment of the present invention.

FIG. 1 is a block diagram illustrating a video CD player for explaining an AV decoder control method and an AV decoder control apparatus according to a first embodiment of the present invention. In FIG. 1, an input unit 100 is composed of, for example, a remote controller having at least one button and a control program thereof. When the user pushes the button, the input unit 100 outputs the corresponding signal. A playback controller 101 is implemented by a CPU (Central Processing Unit), a main storage such as a semiconductor memory, and control programs thereof. The playback controller receives the signal from the input unit 100, and controls a drive controller 102 and an AV decoder controller 103. The drive controller 102 is implemented by a CPU, a main storage such as a semiconductor memory, and control programs thereof. The drive controller 102 controls a drive 104 according to an instruction from the playback controller 101. The AV decoder controller 103 is implemented by a CPU, a main storage such as a semiconductor memory, and control programs thereof. The AV decoder controller 103 controls an AV decoder 105 according to an instruction from the playback controller 101. The drive 104 reads data from an optical disk. The AV decoder 105 is implemented by a buffer for temporarily storing part of a bit stream before it is decoded, a video decoder, and an audio decoder, which decoders perform inverse DCT (Discrete Cosine Transform) on video packets and audio packets to decode these packets. The AV decoder 105 decodes the video packets and audio packets taken from the drive 104 to obtain video data and audio data. An output unit 106 is implemented by a display and a speaker, or the like, and outputs the video data and audio data decoded by the AV decoder 105.

Figure 3:
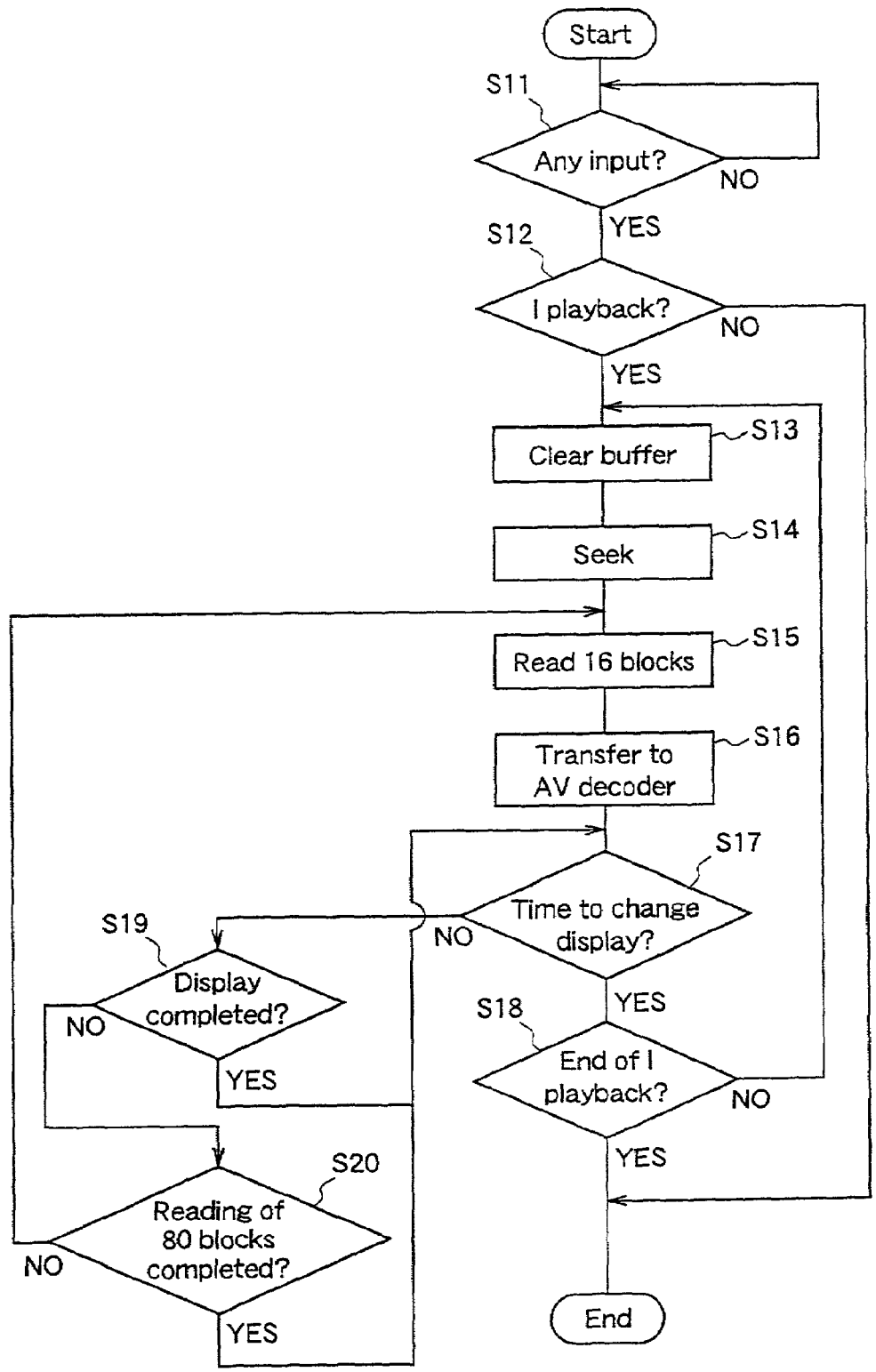
FIG. 3 is a flowchart for explaining the AV decoder control method and the AV decoder control apparatus according to the first embodiment.

FIG. 3 is a flowchart illustrating the flow of control when the video CD player performs I playback for explaining the AV decoder control method and the AV decoder control apparatus according to the first embodiment.

Figure 2:
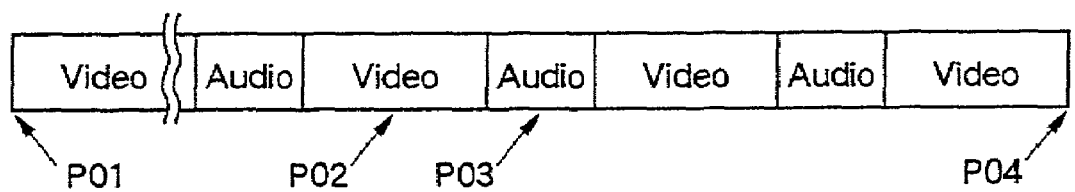
FIG. 2 is a diagram illustrating an MPEG1 stream for explaining the AV decoder control method and the AV decoder control apparatus according to the first embodiment.

Further, FIG. 2 is a diagram illustrating the structure of an MPEG1 stream having video packets and audio packets to be subjected to I playback for explaining the AV decoder control method and the AV decoder control apparatus according to the first embodiment.

Hereinafter, the operation of the video CD player during I playback will be described with reference to FIGS. 1 to 3.

It is assumed that the MPEG1 stream shown in FIG. 2 is currently being played back normally, and the user will switch the operation at point P03 from normal playback to reverse playback, i.e., backward I playback.

In step S11, the playback controller 101 waits for the user's input of an instruction to the input unit 100. When there is an input, the control proceeds to step S12. In step S12, it is decided whether the user's instruction is I playback or not. When it is I playback, the control proceeds to step S13. When it is not I playback, the control proceeds to END step. In step S13, the playback controller 101 instructs the AV decoder controller 103 to clear the contents of the buffer of the AV decoder 105. The AV decoder controller 103 clears the buffer of the AV decoder 105. Then, the control proceeds to step S14.

In step S14, the playback controller 101 instructs the drive controller 102 to seek a specific address. On receipt of the instruction from the playback controller 101, the drive controller 102 controls the drive 104 so that it seeks the specific address. In order to perform backward I playback from the point P03, the seek point should be turned back from the point P03 by a predetermined step width of the bit stream. In this first embodiment, the step width is an arbitrary width larger than 80 blocks. On receipt of the instruction from the playback controller 101, the drive controller 102 seeks the drive 104 at the point P02.

Subsequently, decoding of the bit stream having a data length of 80 blocks is performed from the position P02 in the bit stream progressing direction, i.e., in the forward direction. In this first embodiment, when performing decoding of the 80-block bit stream, this 80-block bit stream is divided into continuous plural bit streams having a predetermined bit length, e.g., bit streams each having a data length of 16 blocks, and these 16-block bit streams are sequentially input to the AV decoder 105 from the P02 side at predetermined time intervals.

Initially, in step S15, the playback controller 101 instructs the drive controller 102 to read 16 blocks. On receipt of the instruction from the playback controller 101, the drive controller 102 controls the drive 104 so that it reads the 16 blocks. Then, the control proceeds to step S16. In step S16, the playback controller 101 instructs the AV decoder controller 103 to start transfer of the bit stream which has been read in step S15. On receipt of the instruction from the playback controller 101, the AV decoder controller 103 controls the AV decoder 105 so that it starts the process of transferring the read bit stream from the drive 104 to the AV decoder 105, and outputting the video data and audio data obtained from the drive 104 to the output unit 106. The AV decoder 105 starts decoding under control of the AV decoder controller 103. When an I picture appears, this I picture is sent to the output unit 106 for display. Display of this I picture is continued until the next I picture is displayed.

Next, the control proceeds to step S17. In step S17, the playback controller 101 detects the elapsed time from when the playback controller 101 performs seek of the drive 104 to the present time. When the time has reached a predetermined time, the control proceeds to step S18. When it has not reached the predetermined time yet, the control proceeds to step S19.

In step S19, the playback controller 101 decides whether or not there is an information from the AV decoder 105 that the AV decoder 105 has performed I-picture switching. When the I picture has been switched, the control proceeds to step S17. When the I picture has not been switched, the control proceeds to step S20.

In step S20, the playback controller 101 decides whether or not the drive 104 has performed reading of the predetermined blocks corresponding to one seek. When reading of the predetermined blocks has been performed, the control proceeds to step S17. In this case, the predetermined blocks for one seek are 80 blocks as described above, and only 16 blocks have been read from the seek point P02 and, therefore, the control returns to step S15.

The process steps from S15 to S20 are repeated, and when 80 blocks have been read from the point P02 shown in FIG. 2 or when display of the next I picture has been completed, the playback controller 101 decides whether the elapsed time from when the drive 104 performs seek to the present time exceeds the predetermined time or not in step S17. When the elapsed time exceeds the predetermined time, it is decided in step S18 whether I playback should be ended or not. When seek does not reach the end point P01 of the bit stream and there is no instruction to end I playback, the control proceeds to step S13, and new seek is performed from the current seek point P02.

In this way, the above-described process steps are repeated, and when seek for I playback reaches the point P01 at the beginning of the bit stream, the control proceeds to step S18 to end I playback.

In this first embodiment, the interval on the bit stream between each seek point in reverse playback and the point immediately before the seek is larger than 80 blocks, and 80 blocks of data are decoded from each seek point in the forward direction, and I pictures included in the data are displayed. Therefore, decoding for reverse playback is performed by sequentially inputting a plurality of 80-block bit streams which are positioned at predetermined intervals, in the AV decoder 105, starting from the reverse playback start position. As the result, the time required for moving the seek (playback) point on the bit stream in I playback by a distance equivalent to one seek is equal to the time for reading and decoding fewer blocks of data than the data blocks included in one seek, i.e., the time for reading and decoding 80 blocks of data. Accordingly, in this first embodiment, the time required for moving the seek point on the bit stream in I playback by a distance equivalent to one seek can be reduced as compared with the time for reading and decoding the data of the bit length for one seek in the conventional I playback, i.e., the time for reading and decoding all of the data having the bit length longer than 80 blocks. Therefore, the time for moving the seek point on the bit stream in fast forward playback and reverse playback can be reduced, resulting in high-speed I playback.

Further, when display of I pictures is completed before decoding of 80 blocks of data for one seek is completed, the decoder 105 informs the end of display to the AV decoder controller 103. On receipt of this, the AV decoder controller 103 decides to end the display and starts next seek. So, the next seek can be started before decoding all of the 80 blocks, whereby the time for moving the seek point on the bit stream is further reduced.

Further, when performing seek on the bit stream in the backward direction, the buffer of the decoder 105 is cleared whether I picture display is updated or not. Therefore, the bit stream inputted to the AV decoder 105 is always continuous from the sought position. Accordingly, in the case where the bit stream of the previous seek remains in the buffer, if the bit stream from the next seek position is inputted to the buffer, a discontinuous bit stream occurs, resulting in abnormal display such as separated images. In this first embodiment, however, since the buffer of the decoder is maintained in the normal state, such a discontinuous bit stream does not occur, thereby avoiding abnormal display. Further, even when the buffer is being cleared, the previous I picture is continuously displayed. So, even when the bit stream includes errors, block noise and a flashing screen due to decoding of insignificant data are avoided.

While in this first embodiment the bit length of the bit stream to be decoded in one seek is 80 blocks, the bit length is not restricted to 80 blocks, and any bit length may be employed so long as I playback is possible.

Embodiment 2

Figure 5:
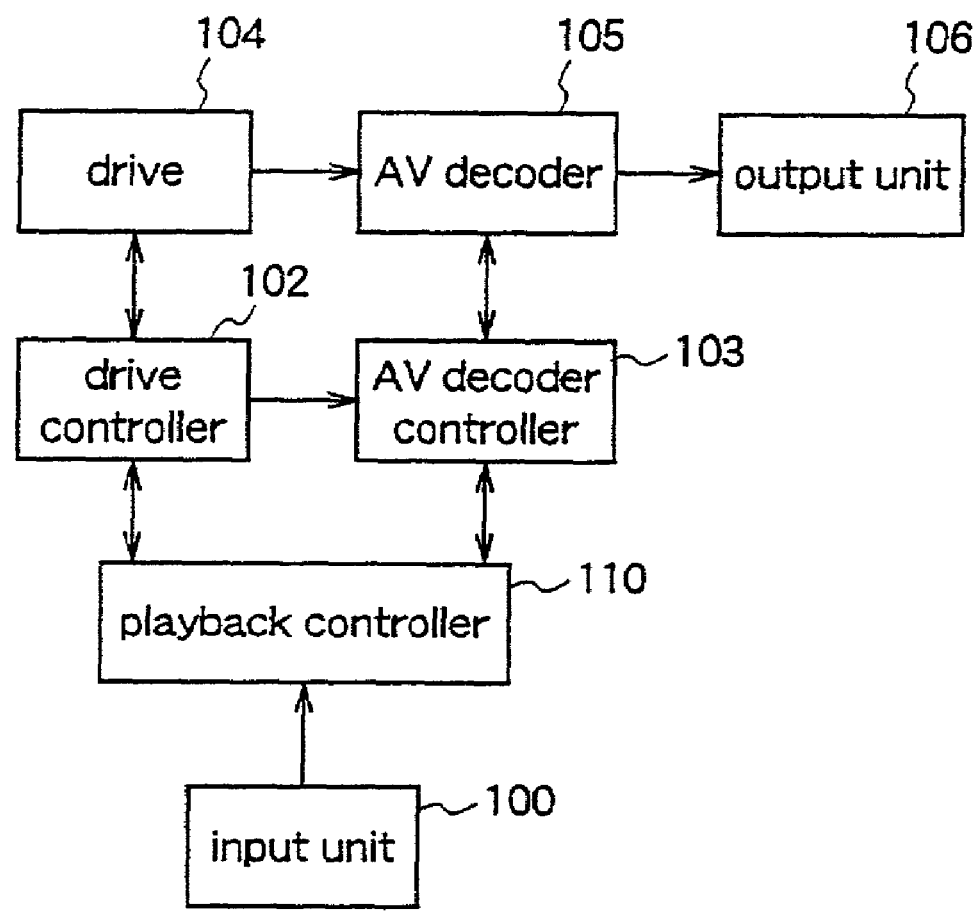
FIG. 5 is a block diagram illustrating a video CD player for explaining the AV decoder control method and the AV decoder control apparatus according to the second embodiment.

FIG. 5 is a block diagram illustrating a video CD player, for explaining an AV decoder control method and an AV decoder control apparatus according to a second embodiment of the present invention. This video CD player includes a playback controller 110 which obtains an optimum bit length from the results of repetition of inputting bit streams having a predetermined bit length to the AV decoder 105, and thereby optimizes the bit length of bit streams to be decoded by the AV decoder 105. In the figure, the same reference numerals as those shown in FIG. 1 denote the same or corresponding parts.

Figure 4:
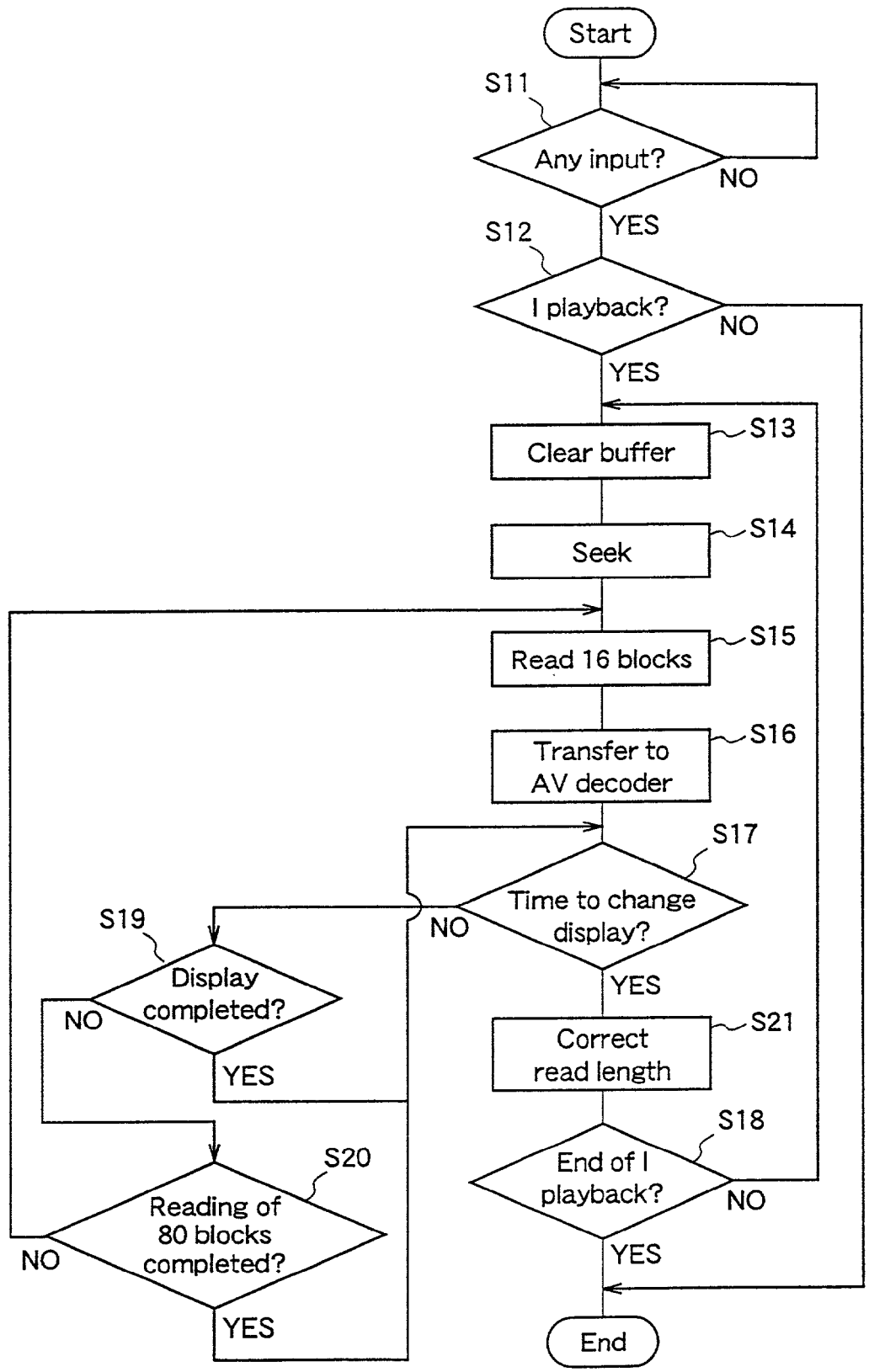
FIG. 4 is a flowchart for explaining an AV decoder control method and an AV decoder control apparatus according to a second embodiment of the present invention.

FIG. 4 is a flowchart illustrating the flow of control when the video CD player performs I playback, for explaining the AV decoder control method and the AV decoder control apparatus according to this second embodiment.

Hereinafter, the operation of the CD player during I playback will be described with reference to FIG. 4. In this second embodiment, as in the first embodiment, it is assumed that the user performs fast reverse playback as trick play during playback of a bit stream having the structure shown in FIG. 2. In FIG. 4, the same step numbers as those shown in FIG. 3 denote the same or corresponding processes.

In this second embodiment, the number of blocks in the bit stream to be decoded in one seek, which is determined in step S20 of FIG. 4, is not fixed but dynamically updated by learning, and the number of blocks is determined in step S21.

In step S20, the playback controller 101 decides whether or not the drive 104 has read predetermined blocks during decoding for the current seek. When the drive 104 has read the predetermined blocks, the control proceeds to step S17. When the drive 104 has not read the blocks yet, the control returns to step S15.

In step S21, the number of predetermined blocks to be decided in step S20 is optimized. This optimization is performed as follows. When display of I pictures by the AV decoder 105 is performed normally, the number of blocks which have been read by the drive 104, which are required until the previous I picture display is completed, is compared with the number of blocks required until the current display is completed, and the smaller one is adopted as the number of predetermined blocks to be used in step S20. Next, the control proceeds to step S18. When end of I playback is confirmed by end of the bit stream or another request from the user, I playback is ended. When end of I playback is not confirmed, the control returns to step S13 and the above-described process steps are repeated.

As described above, according to the second embodiment of the present invention, the same effects as those provided by the first embodiment are achieved. Moreover, since the length of the bit stream to be decoded in one seek is optimized in accordance with the bit stream to be played back, decoding of data other than I pictures is reduced during I playback, resulting in higher-speed I playback. Further, the throughput of the whole system can be improved, and the system can rapidly respond to a user's request.

While in the first and second embodiments fast reverse playback is described, the present invention can be applied to fast forward playback so long as it is I playback. Also during fast forward playback, by sequentially decoding a plurality of bit streams having a predetermined bit length and positioned at regular intervals from the playback starting position, the same effects as those provided by the first and second embodiments are achieved.

While in the first and second embodiments video CD players are employed, the present invention can be applied to other AV decoding/playback apparatuses with the same effects as those provided by the first and second embodiments.

As described above, an AV decoder control method and an AV decoder control apparatus according to the present invention are available for trick play such as fast forward playback or fast reverse playback and, particularly, they are suitable for a video CD player which employs MPEG1 as a video data compression/multiplexing method.

What is claimed is:

1. An AV decoder control method for controlling an AV decoder included in an AV decoding/playback apparatus which decodes and plays back a bit stream including MPEG video data and audio data, said method controlling the AV decoder so that it performs a trick play by continuously displaying I pictures of the MPEG video data:

wherein a plurality of bit streams having a predetermined bit length and positioned at arbitrary intervals are separately and sequentially input to the AV decoder and decoded, and I pictures included in these bit streams are continuously displayed while sequentially updating the I pictures;

wherein:

it is decided whether display of I pictures in a bit stream of the predetermined bit length by the AV decoder has been completed or not; and when the display of I pictures has been completed, a next bit stream of the predetermined bit length, which follows the bit stream for which display of I pictures has ended, is input to the AV decoder.

2. An AV decoder control method for controlling an AV decoder included in an AV decoding/playback apparatus which decodes and plays back a bit stream including MPEG video data and audio data, said method controlling the AV decoder so that it performs a trick play by continuously displaying I pictures of the MPEG video data:

wherein a plurality of bit streams having a predetermined bit length and positioned at arbitrary intervals are separately and sequentially input to the AV decoder and decoded, and I pictures included in these bit streams are continuously displayed while sequentially updating the I pictures;

a plurality of bit streams which are obtained by dividing each of the bit streams having the predetermined bit length; are sequentially input to the AV decoder at predetermined intervals;

every time one divided bit stream is input to the AV decoder, it is decided whether display of I pictures by the AV decoder has been completed or not;

when display of I pictures has not been completed yet, a next divided bit stream within the same bit stream is input to the AV decoder; and when display of I pictures has been completed, a next bit stream of the predetermined bit length, which follows the bit stream for which display of I pictures has ended, is input to the AV decoder.

3. An AV decoder control method for controlling an AV decoder included in an AV decoding/playback apparatus which decodes and plays back a bit stream including MPEG video data and audio data, said method controlling the AV decoder so that it performs a trick play by continuously displaying I pictures of the MPEG video data:

wherein a plurality of bit streams having a predetermined bit length and positioned at arbitrary intervals are separately and sequentially input to the AV decoder and decoded, and I pictures included in these bit streams are continuously displayed while sequentially updating the I pictures; and an optimum bit length of the bit streams having the predetermined bit length is obtained from repetition of inputting these bit stream to the AV decoder, and the bit length is optimized using this result.

4. An AV decoder control apparatus for controlling an AV decoder included in an AV decoding/playback apparatus which decodes and plays back a bit stream including MPEG video data and audio data, said apparatus controlling the AV decoder so that it performs a trick play by continuously displaying I pictures of the video data, said apparatus comprising:

means for controlling the AV decoder so that the AV decoder decodes a plurality of bit streams having a predetermined bit length and positioned at arbitrary intervals, which are separately and sequentially input to the AV decoder, and continuously displays I pictures included in these bit streams while sequentially updating the I pictures;

means for deciding whether display of I pictures in a bit stream of the predetermined bit length by the AV decoder has been completed or not; and when display of I pictures has been completed, said means inputting, to the AV decoder, a next bit stream of the predetermined bit length that follows the bit stream for which display of I pictures has ended.

5. An AV decoder control apparatus for controlling an AV decoder included in an AV decoding/playback apparatus which decodes and plays back a bit stream including MPEG video data and audio data, said apparatus controlling the AV decoder so that it performs a trick play by continuously displaying I pictures of the video data, said apparatus comprising:

means for controlling the AV decoder so that the AV decoder decodes a plurality of bit streams having a predetermined bit length and positioned at arbitrary intervals, which are separately and sequentially input to the AV decoder, and continuously displays I pictures included in these bit streams while sequentially updating the I pictures;

means for sequentially inputting a plurality of bit streams which are obtained by dividing each of the bit streams having the predetermined bit length, to the AV decoder at predetermined intervals, and for deciding whether display of I pictures by the AV decoder has been completed or not every time one divided bit stream is input;

when display of I pictures has not been completed, said means inputting a next divided bit stream within the same bit stream to the AV decoder; and when display of I pictures has been completed, said means inputting, to the AV decoder, a next bit stream of the predetermined bit length that follows the bit stream for which display of I pictures has ended.

6. An AV decoder control apparatus for controlling an AV decoder included in an AV decoding/playback apparatus which decodes and plays back a bit stream including MPEG video data and audio data, said apparatus controlling the AV decoder so that it performs a trick play by continuously displaying I pictures of the video data, said apparatus comprising:

means for controlling the AV decoder so that the AV decoder decodes a plurality of bit streams having a predetermined bit length and positioned at arbitrary intervals, which are separately and sequentially input to the AV decoder, and continuously displays I pictures included in these bit streams while sequentially updating the I pictures; and means for obtaining an optimum bit length of the bit streams having the predetermined bit length, from repetition of inputting these bit stream to the AV decoder, and for optimizing the bit length by using this result.

* * * * *